(12) United States Patent
West et al.

(10) Patent No.: US 11,059,527 B2
(45) Date of Patent: *Jul. 13, 2021

(54) DETACHABLE, MODULAR VEHICLE CONVERSION SYSTEMS AND METHODS THEREOF

(71) Applicant: Radius Outfitters INC., Monterey, CA (US)

(72) Inventors: Cody West, Carmel Valley, CA (US); Asa Engstrom, Monterey, CA (US)

(73) Assignee: RADIUS OUTFITTERS INC., Monterey, CA (US)

(\*) Notice: Subject to any disclaimer, the term of this patent is extended or adjusted under 35 U.S.C. 154(b) by 61 days.

This patent is subject to a terminal disclaimer.

(21) Appl. No.: 16/873,059

(22) Filed: Jan. 24, 2020

(65) Prior Publication Data

US 2020/0172175 A1 Jun. 4, 2020

Related U.S. Application Data

(63) Continuation of application No. 15/998,217, filed on Jul. 18, 2018, now Pat. No. 10,611,415.

(60) Provisional application No. 62/707,470, filed on Nov. 3, 2017.

(51) Int. Cl.
*B62D 33/04* (2006.01)
*B62D 65/00* (2006.01)

(52) U.S. Cl.
CPC ........... *B62D 33/044* (2013.01); *B62D 33/04* (2013.01); *B62D 65/00* (2013.01)

(58) Field of Classification Search
CPC ...... B62D 33/044; B62D 33/04; B62D 65/00; E04H 15/32; E04H 15/62
USPC ........................ 224/403–405; 135/120.3, 114
See application file for complete search history.

(56) References Cited

U.S. PATENT DOCUMENTS

| | | | | |
|---|---|---|---|---|
| 993,015 | A * | 5/1911 | Bengtsson | A61F 13/105 294/25 |
| 2,793,764 | A * | 5/1957 | Stork | A47F 7/24 211/204 |
| 3,604,439 | A * | 9/1971 | Thomka | E04H 15/36 135/136 |
| 4,779,916 | A * | 10/1988 | Christie | B60R 9/00 296/171 |
| 6,908,107 | B2 * | 6/2005 | Barth | B60R 21/13 280/756 |
| 8,157,312 | B2 * | 4/2012 | Bliss, Jr. | B60P 3/14 296/37.6 |
| 2012/0285918 | A1 * | 11/2012 | Ulle | F16B 11/008 211/182 |

\* cited by examiner

*Primary Examiner* — Scott T McNurlen
(74) *Attorney, Agent, or Firm* — James A. Gavney, Jr.; JAG Patent Services

(57) ABSTRACT

The present invention discloses a detachable, modular vehicle conversion system with universal adapter couplers and adapters to enable conversion of a vehicle, such as a van, cargo van, or trailer from a single-purpose vehicle to one that accommodates a variety of auxiliary units for camping, mobile offices, or industrial purposes, and which allows the user to switch between different uses. This modular conversion system has components that allow for different configurations that can be readily changed to suit the user's needs.

13 Claims, 10 Drawing Sheets

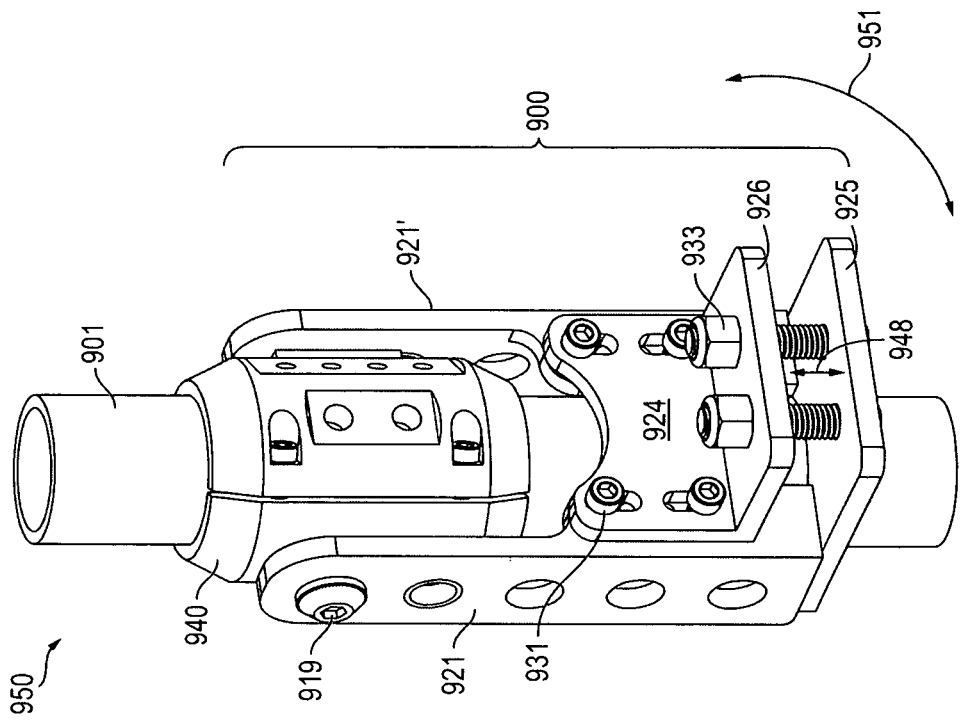
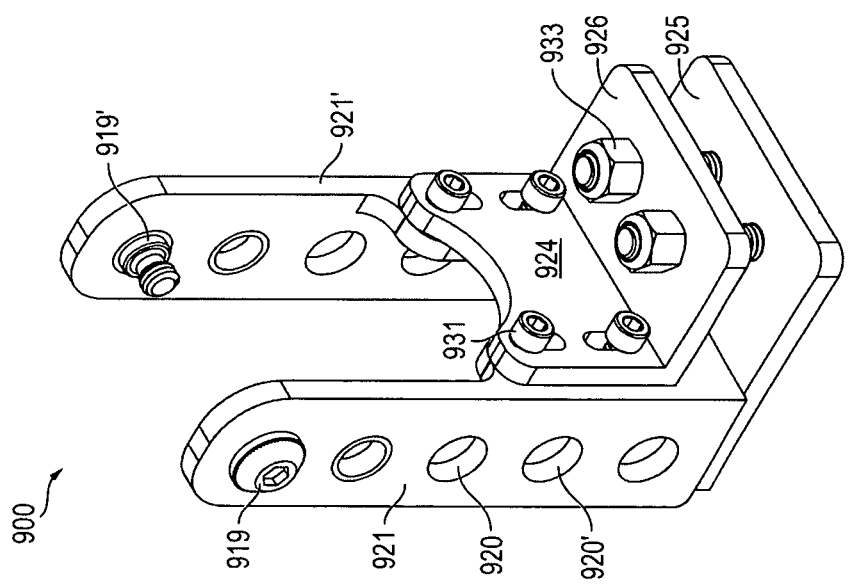
FIG. 12B
FIG. 12A

DETACHABLE, MODULAR VEHICLE CONVERSION SYSTEMS AND METHODS THEREOF

RELATED APPLICATION

This Application is a continuation application of the co-pending U.S. patent application Ser. No. 15/998,217, filed Jul. 18, 2018 and titled "DETACHABLE, MODULAR VEHICLE CONVERSION SYSTEM AND METHODS THEREOF." This application claims priority under 35 U.S.C. § 119(e) from the U.S. provisional patent application Ser. No. 62/707,470, filed on Nov. 3, 2017, and titled "DETACHABLE, MODULAR VEHICLE CONVERSION SYSTEM AND METHODS THEREOF." The co-pending U.S. patent application Ser. No. 15/998,217, filed Jul. 18, 2018 and titled "DETACHABLE, MODULAR VEHICLE CONVERSION SYSTEM AND METHODS THEREOF" and the provisional patent application Ser. No. 62/707,470, filed on Nov. 3, 2017, and titled DETACHABLE, MODULAR VEHICLE CONVERSION SYSTEM AND METHODS THEREOF" are both hereby incorporated by reference.

FIELD OF THE INVENTION

The present invention is in the field of vehicle conversions, and pertains more particularly to a modular system which permits the user to selectively convert the interior of a vehicle (such as a van, truck, trailer, plane, boat, bus, car, and the like) for various alternating uses (such as a camper, mobile office, trade vehicle, etc.).

BACKGROUND OF THE INVENTION

Conversion vans are full-sized cargo vans that are outfitted by third party companies or individuals for various specialty uses. The vehicles can be purchased in pre-built configurations for camping, mobile offices, or various types of industrial work, or custom aftermarket builders can equip a van with bespoke items and trims to satisfy the most discerning buyer. While pre-built conversion vans can range between $50,000-$100,000; a custom-built van can easily surpass $150,000.00 for the most basic configurations. These prices put conversion vans beyond the price range of typical customers. As a result, a Do-It-Yourself (DIY) movement has sprung up in the conversion van community in recent years. To have the utility of a conversion without the high costs, a growing number of people have resorted to converting vehicles of all types, including vans, themselves.

The results of a DIY conversion vehicle can vary greatly, based on the skill level of the person(s) doing the conversion. Some DIY conversions can look as professionally done as a custom built $150,000.00 version; while other DIY conversions are less than stellar and look cobbled together from various components by an unskilled amateur. Thus, the DIY process can be both time consuming and costly, with inconsistent and often poor quality workmanship. In addition, DIY conversions which take up to 36 months and which cost as much as a pre-built conversion.

Existing pre-built conversions, custom built conversions, and DIY conversions all require permanent installation of the components. Installation requires drilling holes in the floors and often the walls of vehicles to secure the various components. For individuals who rent or lease vehicles, such as cargo vans or trailers, they are prohibited from making conversions or alternations to the vehicle by contract.

In addition, once a custom made conversion is complete using existing systems and techniques, the configuration within the vehicle becomes permanent. This can be problematic because, in a traditional living or working space, people may want or need to rearrange the location of furniture or appliances as desired. Existing vehicle conversion systems do not allow for easy reconfiguration. With existing conversion vehicles, switching from a bedroom to an office set-up essentially requires starting from scratch for each configuration, because the hardware and framing structure used to secure the office components to the interior of the vehicle are different than those that are used for securing bedroom components.

Thus, there remains a need for a vehicle conversion system and method to allow individuals to modify vehicles for camping, mobile offices, or industrial work and back again without causing permanent damage to the vehicle.

SUMMARY OF THE INVENTION

The present invention is directed to a detachable, modular vehicle conversion system to enable conversion of a vehicle, such as a van, cargo van, truck, trailer, or similar vehicle that includes a significant enclosed area, from a single-purpose vehicle, to one that accommodates a variety of auxiliary units for camping, mobile offices, home, or industrial purposes, and which allows the user to switch between different uses. Such a modular conversion system may be custom, or purpose-built for specific vehicles. This modular conversion system may have different components to allow for different configurations that can easily be changed to suit the user's needs. For example, an individual may lease a van and using a modular vehicle conversion system of the present invention, configure that van as a mobile office during the week, as a car-camping base on the weekends, and for transporting bikes for a one-time race. The present modular system allows for various auxiliary units to be secured in a wide range of configurations within a vehicle, without requiring drilling of holes in the vehicle floor, ceiling, or walls, or otherwise permanently damaging the converted vehicle.

Specifically, the present invention is a detachable, modular vehicle conversion system, which is securely installed in the cargo end of a vehicle. The modular vehicle conversion system includes a frame structure consisting of a plurality of frame structure elements, including U-shaped tube modules and straight segments inter-connected by spanner elements to form a canopy support structure or canopy support frame (frame structure). The frame structure is positioned and secured along the interior walls of the vehicle. Preferably, the frame structure is secured using the vehicle attachment system that includes a base plate and floor coupler as described herein. Other embodiments of the system include multiple spanner elements that allow a user to customize the location of a bed, shelf, desk, chair, couch, table, storage cubbies, tool storage units, parts bins, and so forth. In preferred embodiments, the spanner elements are attached to the frame structure of the modular vehicle conversion system using one or more universal adapter couplers.

The universal adapter couplers of the present invention connect the frame structure elements of the frame structure, and connect spanner elements within the frame structure. In an embodiment, the adapter couplers attach straight segments of the frame structure to the upper U-shaped elements. In another embodiment, the universal adapter couplers are attached to a spanner or frame structure element in a desired location for the purpose of allowing attachment of auxiliary units, such as bed platforms, shelves, desks, and the like.

The universal adapter coupler includes a first elongate adapter segment that includes a first outer surface and a first concave interior surface. The concave elongate surface is adapted to fit against and partially around a first portion of a straight segment, U-shaped tube module, or spanner element of the modular vehicle conversion system. Thus, the concave interior surface of the elongate adapter segment fits against the convex exterior surface of a straight segment, U-shaped tube module, or spanner element. A second elongate adapter segment complements the first elongate adapter segment, by having a concave interior surface that fits against the convex exterior surface of the straight element. When the first elongate adapter segment is secured against the second elongate adapter segment around a straight segment, U-shaped tube module, or spanner element, it forms the tubular universal adapter coupler.

The universal adapter aspect of the coupler of the present invention is found in the attachment apertures that extend partially through the elongate adapter segments. These apertures have varying surfaces and diameters to accommodate a range of securing devices (e.g., screws). The securing devices are used to secure the auxiliary units to the conversion system via the universal adapter coupler, as well as linking universal adapter couplers together to form T-bar adapter units, hinge coupler, fixed angle adapter units and variable angle adapter units.

In a preferred embodiment, the system is secured to the interior of the vehicle using a vehicle attachment system, that includes a pre-bored base plate with apertures that align with factory-installed apertures on the floor and ceiling of the interior of a vehicle, and a floor coupler integral or otherwise attached to the base plate. Using the universal pre-bored baseplate, the vehicle attachment system anchors the vehicle conversion system to the interior floor, ceiling, or a side wall of the vehicle. In some embodiments, this anchoring is accomplished using pre-existing rails or drilled out holes.

In an alternative embodiment, the system is secured by virtue of its modular installation, such that the modular elements exert pressure between the ceiling and floor of the vehicle either in addition to, or in place of, other modular elements exerting pressure between the interior side walls of the vehicle.

The system includes a vehicle attachment plate, which can be used to anchor the detachable modular vehicle conversion system to the interior of the vehicle. The vehicle attachment plate is comprised of a base plate, suitable for anchoring the modular system to a wall, floor, or ceiling within the vehicle, and a tubular insertion clamp affixed to the base plate.

The details of one or more implementations are set forth in the accompanying drawings and the description below. Other features and advantages will become apparent from the description, the drawings, and the claims.

BRIEF DESCRIPTION OF THE DRAWINGS

FIG. 12A is a perspective view of a support hinge assembly of the present invention.

FIG. 12B is a perspective view of the support hinge assembly of FIG. 12A couple to a universal coupler to from hinge coupler, in accordance with the embodiments of the invention.

DETAILED DESCRIPTION OF THE INVENTION

Figure 1:
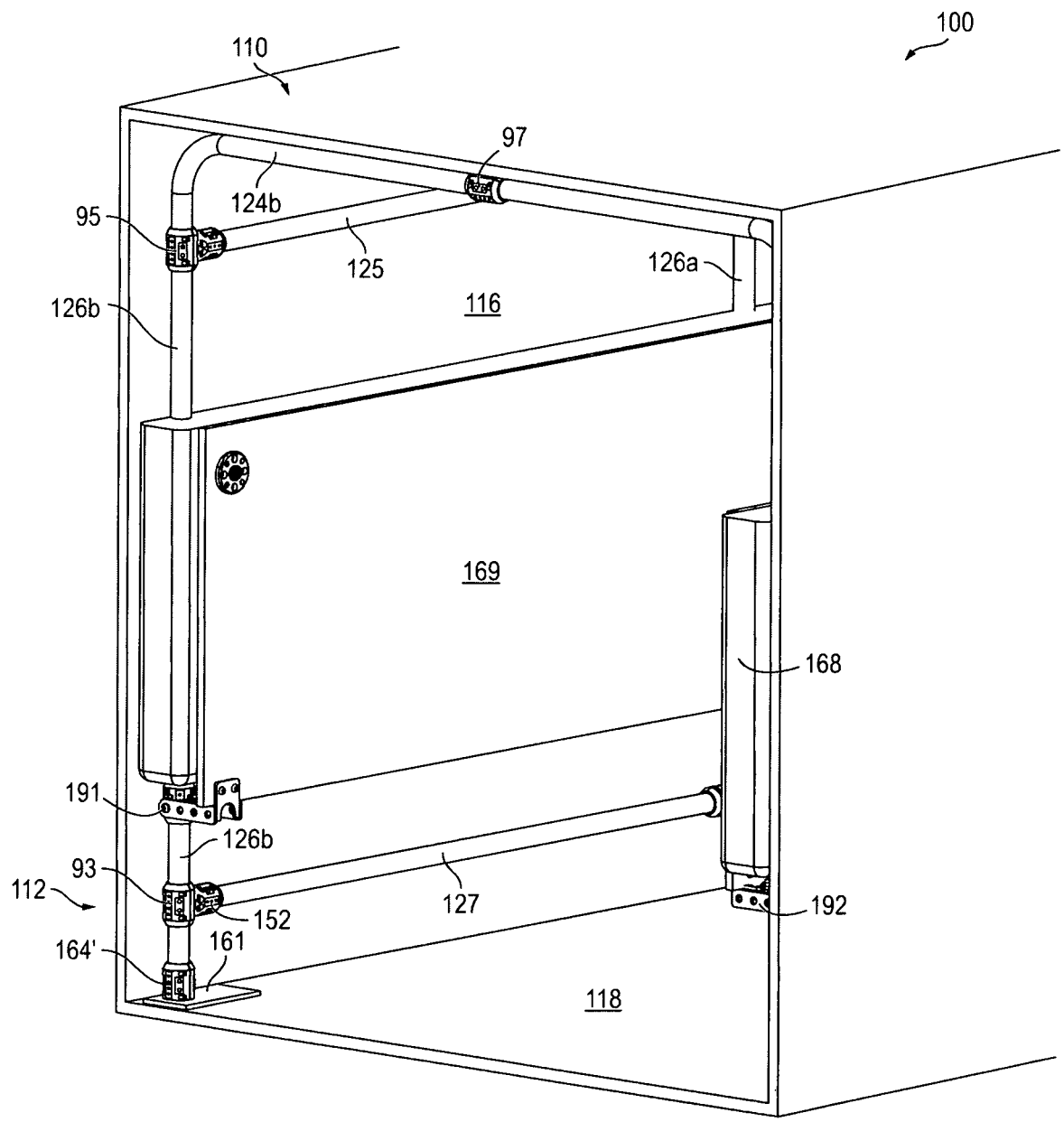
FIG. 1 is a perspective view of one embodiment of the detachable, modular vehicle conversion system of the present invention as installed within the interior of the cargo end of a vehicle.

Referring to the illustrated in FIG. 1, the inventive vehicle conversion system 100, hereafter conversion system, is installed within the interior of a vehicle body 110. As shown in FIG. 1, the conversion system 100 fits at a cargo end of cargo body 112 of the vehicle, which includes a ceiling (not shown), interior walls 116 (not all interior walls are shown), and a floor 118. The conversion system 100 may be modified for use with any vehicle, such as a van, recreational vehicle, truck, trailer, or any other type of moving vehicle that includes an open cargo area which a user wishes to modify to add auxiliary items, such as a bed, cabinet, table, storage bin, and the like.

The conversion system 100 is installed within the vehicle body 110 such that certain elements of the conversion system 100 are aligned closely within the cargo end 112 and along the interior walls 116 and ceiling (not shown). As shown in further detail in FIG. 2, the vehicle conversion system 100 includes a first U-shaped tube module 122a and a second U-shaped tube module 122b, each of which has an upper central U-shaped segment 124a and 124b which generally are shaped to align with the shape of the interior of the vehicle. The width 119 of the upper central U-shaped segment upper central U-shaped segments 124a and 124b can vary to extend along the entire width of the vehicle ceiling or some portion of the width of the vehicle ceiling without affecting the functionality of the conversion system 100 as a whole.

The upper central U-shaped segments 124a and 124b curve at each end to extend downward along a straight segments of the U-shaped tube modules 122a and 122b to reach the vehicle floor with straight leg segments 126a, 126a', 126b and 126b'. The assembly of the upper U-shaped segments 124a and 124b, straight segments of the U-shaped tube modules 122a and 122b and the leg segments 126a, 126a', 126b and 126b' are referred to herein as arching support structures 131 and 133. Each portion of the arching support structures 131 and 133 can be contiguous, monolithic, or formed from multiple segments, each which connect together to extend from the upper central U-shaped segments 124a and 124b to the vehicle floor, as describe. Where the arching support structures 131 and 133 are formed from multiple segments, each of the segments can be secured together using any suitable meaning including but not limited to threaded male/female ends, welding or sleeve connectors, screws, clamps and universal adapter couplers, such as the universal couplers 140 and 140' described with reference to FIGS. 3 and 4, or combinations thereof.

The conversion system 100 further includes spanner elements or spanner tubes 125 and 127 (FIG. 1) and/or 127', 128 and 129 (FIG. 2) to stabilize the conversion system 100 and connect the arching support structures 131 and 133. The spanner elements or spanner tubes 125 and 127 and/or 127', 128 and 129 extend between upper central U-shaped segments 124a and 124b the straight segments of the U-shaped tube modules 122a and 122b, the straight leg segments 126a, 126a', 126b and 126b' or any combination thereof to adjust the separation 121 between the arching support structures 131 and 133.

When the arching support structures 131 and 133 are linked to each other or connected together through the spanner elements or spanner tubes 125 and 127 and/or 127', 128 and 129, the structure is herein referred to herein as a canopy support structure or canopy support frame 120. The canopy support structure or canopy support frame can include any number of support structures, such as the arching support structures 131 and 133 and any number of spanner elements or spanner tubes, such as the spanner elements or spanner tubes 125 and 127 and/or 127', 128 and 129 suitable for the application. Further, canopy support structures or canopy frame structures, such as the canopy support structure or canopy frame structure 120, of the present invention can be made to have any number of sizes or shapes to accommodate sizes and shapes of different cargo bodies 112 of different vehicles.

In operation, the vehicle conversion system 100 generally includes several spanner elements extending between at least two arching support structures, such as described above. The number, placement, and spacing of spanner elements depends on the specific desired configuration of the user. The Figures herein are provided for illustrative purposes only and it will be clear to one skilled in the art that the possible variations of spanner element placement are numerous, depending on the nature of the use of the system, e.g., recreational versus office versus personal sleep space.

The spanner elements or spanner tubes 125 and 127 and/or 127' 128 and 129 function to provide stability to the vehicle conversion system 100 and to support auxiliary units 168 and 169 that are attached to the system 100. Examples of auxiliary units 168 and 169 include, but are not limited to, desks, cabinets, storage bins, counters and platforms to support a bed, such as described in further detail below. The spanner elements or spanner tubes 125 and 127 and/or 127', 128 and 129 are coupled to the support structures 131 and 133 universal adapter couplers, such as the universal adapter couplers 140 and 141' and universal tee adapter units, such at the universal tee adapter units 152 shown in FIG. 5. The combination of a universal adapter coupler and universal tee adapter unit are referred to herein as a T-bar connector 91 (FIG. 6).

As shown in FIG. 1, the canopy support structure or canopy support frame 120 has several T-bar connectors 93, 95 and 97 as well as several not shown. In the FIG. 2 the canopy support structure or canopy support frame 120 also includes several T-bar connectors 101, 103, 105, 107, 109 and 111 as well as a universal adapter coupler 140'.

Figure 7:
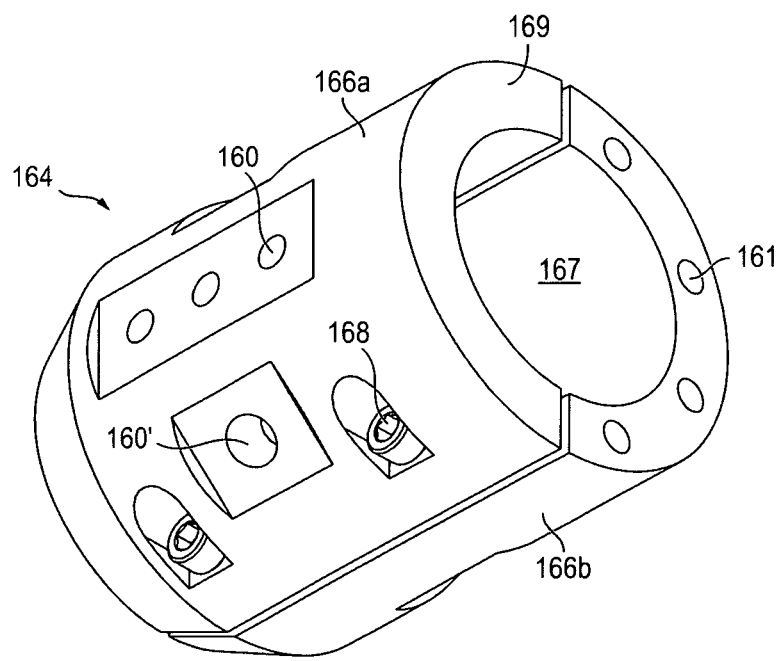
FIG. 7 is a perspective view of a floor coupler of the vehicle attachment system of the present invention.
Figure 8A:
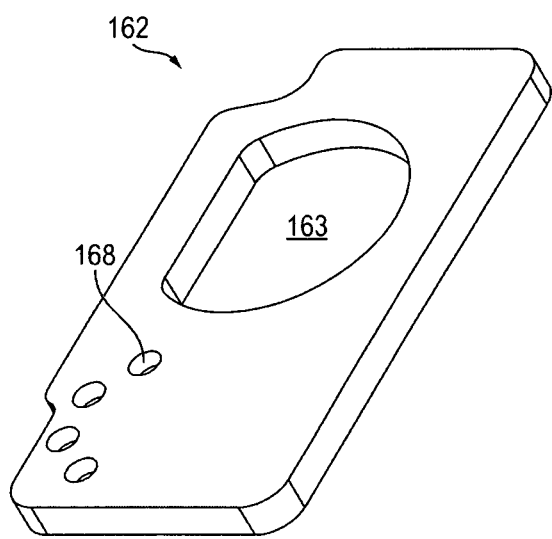
FIG. 8A is a perspective view of the top side of a base plate of the present invention.
Figure 8B:
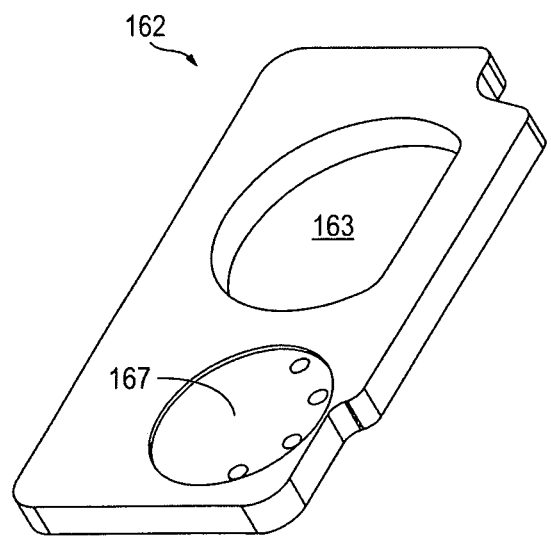
FIG. 8B is a perspective view of the underside of a base plate of the present invention.

Referring to FIG. 1, the conversion system 100 includes a floor coupler 164', such as the floor coupler 164 shown in FIG. 7, that is attached to a floor base plate 161, such as the floor base plate 162 shown in FIGS. 8A-B. Note that in general a floor coupler and a base plate is attached to each of the straight leg segments 126a, 126a', 126b and 126b' when the conversion system is installed.

The conversion system 100 as shown in FIG. 1 includes hinge couplers 191 and 192, such as the hinge coupler 950 shown in FIG. 12B. The hinge couplers 191 and 192 are formed by attaching support hinge assemblies or structure, such as the support hinge assembly or structure 900 shown in FIG. 12A, to a universal coupler, such as the universal coupler 140 shown in FIG. 3. Hinge couplers 191 and 192 are used in the present invention to hingeably attach auxiliary units 168 and 169 to a portion of a canopy support structures or canopy support frame, such as the canopy support structures or canopy support frame 120.

Portions of the arching support structures 131 and 133, and spanner elements or spanner tubes 125 and 127 and/or 127' 128 and 129, or portions thereof, are manufactured from a substantially rigid material, such as steel, aluminum, or similar metals and alloys, composites, aluminum plus composite, rigid plastics or any commination thereof.

Figure 3:
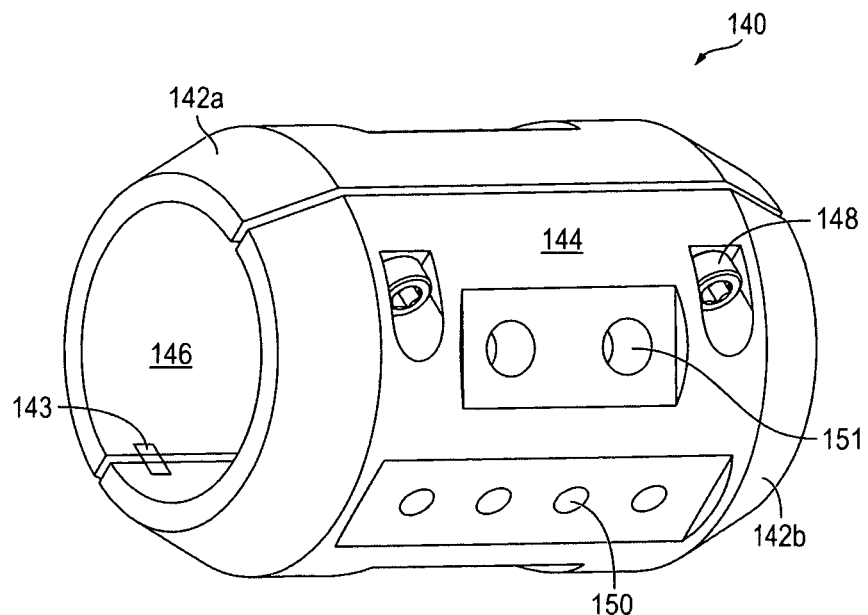
FIG. 3 is a side perspective view of an embodiment of a universal adapter coupler of the present invention.
Figure 4:
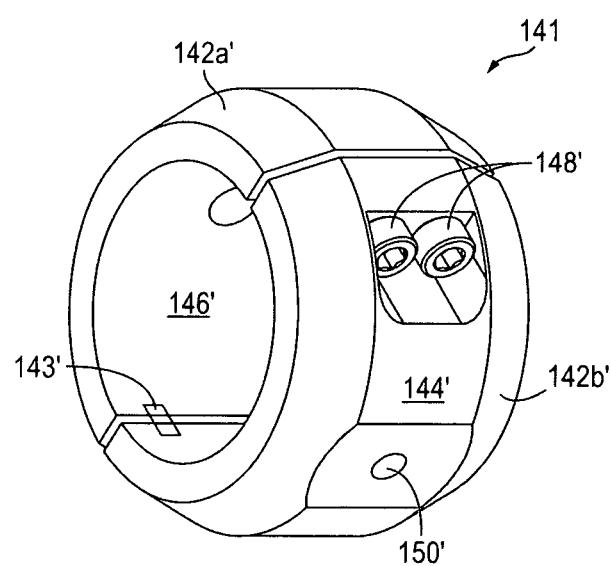
FIG. 4 is a side perspective view of one embodiment of a universal adapter coupler that is used as an accessory clamp in the detachable, modular vehicle conversion system of the present invention.

As described above and below, the conversion system 100 of the present invention uses universal adapter couplers 140 and 141, such as shown in FIGS. 3 and 4. The universal adapter couplers 140 and 141 enable attachment of multiple auxiliary utilities to the canopy support structure or canopy support frame 120. As mentioned, auxiliary utilities can include bed brackets for securing a bed, various platforms used as desks, tables, or other surfaces within the vehicle cargo area, and attachment devices for attaching netting, ropes, and other useful items within the vehicle cargo area.

Universal adapter couplers 140 and 141 of the present invention includes elongate adapter segments 142a, 142b and 142a' and 142b', respectively, that are adapted to fit against each other to secure around any number of tubular segments of the canopy support structure or canopy support frame 120. In this way the universal adapter couplers 140 and 141 can also be referred to as sleeve clamping structures.

The universal adapter couplers 140 and 141 include outer surfaces 144 and 144' that are substantially oblong, either oval or rectangular in shape, and an interior concave surfaces 146 and 146' that are configured to fit and wrap around the tubular segments of canopy support structure or canopy support frame 120. The elongate adapter segments 142a, 142b and 142a' and 142b' are secured using a clamping screws 148 and 148' or other securing mechanism, such as clamp straps and the like. In addition to the clamping screws 148 and 148', the elongated segments 142a, 142b and 142a' and 142b' of the universal adapter couplers 140 and 141 can be joined through a hinge structures 143 and 143' and/or fitted snap features for securing the universal adapter couplers 140 and 141 around tubular segments of canopy support structure or canopy support frame 120. Preferably, the universal adapter couplers 140 and 141 are tapered at one or both ends, or flat at one or both ends to accommodate positioning of the universal adapter couplers 140 and 141 on the tubular segments of canopy support structure or canopy support frame 120.

The universal adapter couplers 140 and 141 each have one or more attachment apertures 150, 151 and 150' on one or both of the elongate adapter segments the elongated segments 142a, 142b and 142a' and 142b'. The attachment apertures 150, 151 and 150' vary in placement, size, depth, and configuration, as shown in FIGS. 3-4. Some attachment apertures 150, 151 and 150' include threaded interior surfaces to accommodate screws, others are sized to accept different standard connectors, snaps or pins. The nature and placement of the attachment apertures 150, 151 and 150' are varied depending on the vehicle in which the system is to be installed, the nature of the auxiliary units to be attached, and commercial considerations in the manufacture of the universal adapter couplers 140 and 141. In a preferred embodiment, sets of the attachment apertures 150, 151 and 150' are positioned such as to allow attachment of auxiliary unit, clamps, hinge structures or other couplers, such as shown in FIGS. 10, 11 and 12A-B.

As illustrated, in a preferred embodiment of the invention, areas around the attachment apertures 150, 151 and 150' are milled to provide flat surfaces 144 and 144'. The flat surface 144 and 144' provide a weight bearing surface area around the attachment apertures to allow the auxiliary units or other attachments to sit flush against the universal adapter couplers 140 an 141. In one embodiment of the present invention, shoulders are milled to provide a bearing pad that assists with locking the auxiliary units or other attachments in position once they are attached to the universal adapter couplers 140 an 141. Although the elongated segments 142a, 142b and 142a' and 142b' are typically designed to fit against each other to form the universal adapter couplers 140 an 141, a gap may remain between the elongate adapter segments 142a, 142b and 142a' and 142b' along their respective connecting surfaces.

The universal adapter coupler 141 as shown in FIG. 4 serves a single-purpose coupler, with a single attachment aperture 151 and one or two clamp screws 148'. However, it will be clear to one skilled in the art that universal adapter couplers 140 and 141 can be make to have any number of lengths with any number of attachment apertures for securing the auxiliary units or other attachments thereto.

Figure 5:
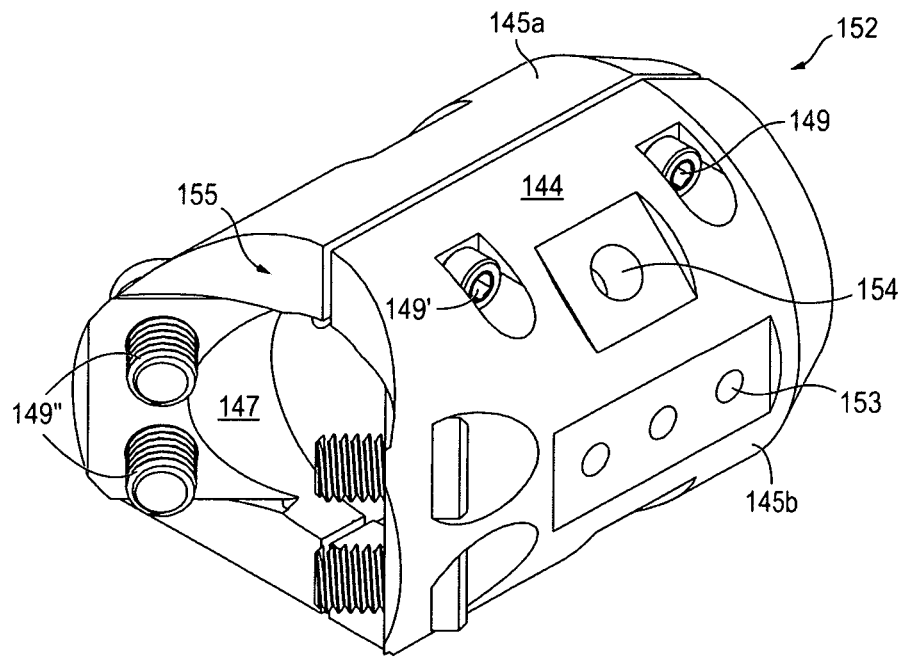
FIG. 5 is a perspective view of a universal tee adapter unit of the present invention.
Figure 6:
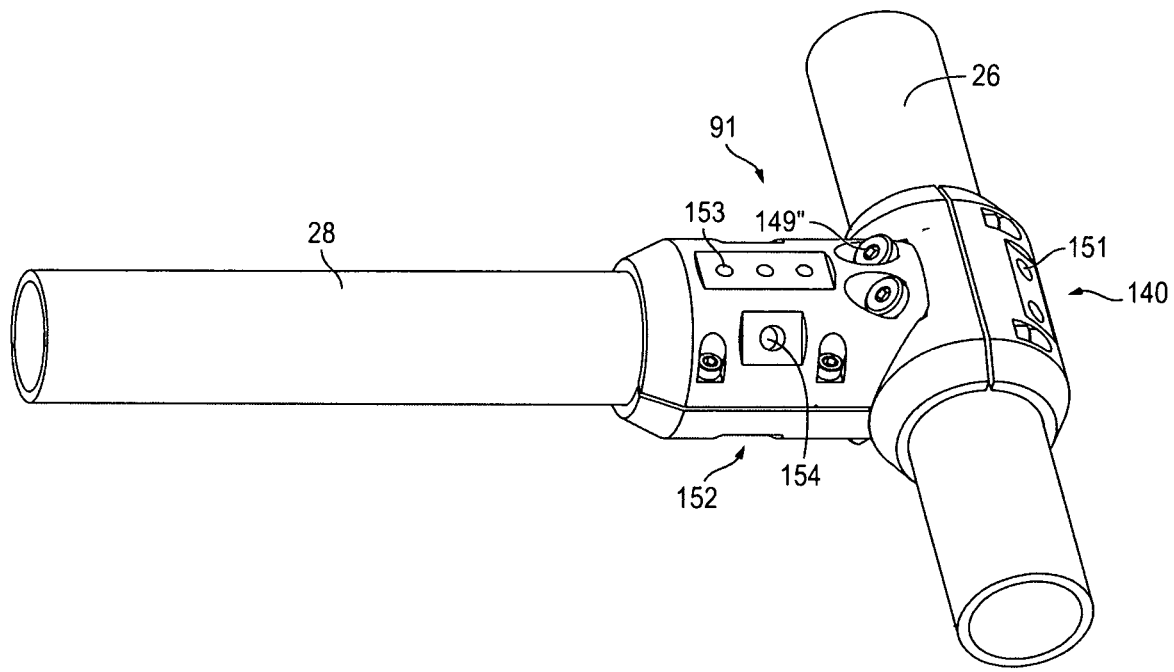
FIG. 6 is a side perspective view of a universal T-bar adapter unit attached to intersecting tubular section of a canopy support structure or canopy support frame.

FIG. 5 illustrates a universal tee adapter unit 152, that has some similar features to the universal adapter couplers 140 and 141 shown in FIGS. 3-4. The universal tee adapter unit 152 is formed from two elongated adapter segments 145 and 145b with concave inner surfaces 147 that when secured together through clamping screws 149 and 149', hinge features, snap features or any combination thereof, form a sleeve structure that secures around truncated end or terminus end of a tubular segment 28 (FIG. 6) of canopy support structure or canopy support frame 120. The universal tee adapter unit 152 has attachment apertures 153 and 154 and preferably has one concave end 155 that fits up against or butts up against, and is secured to, a convex outer surface of the universal adapter coupler 140, as shown in FIG. 6 and described with respect to FIG. 3.

Figure 2:
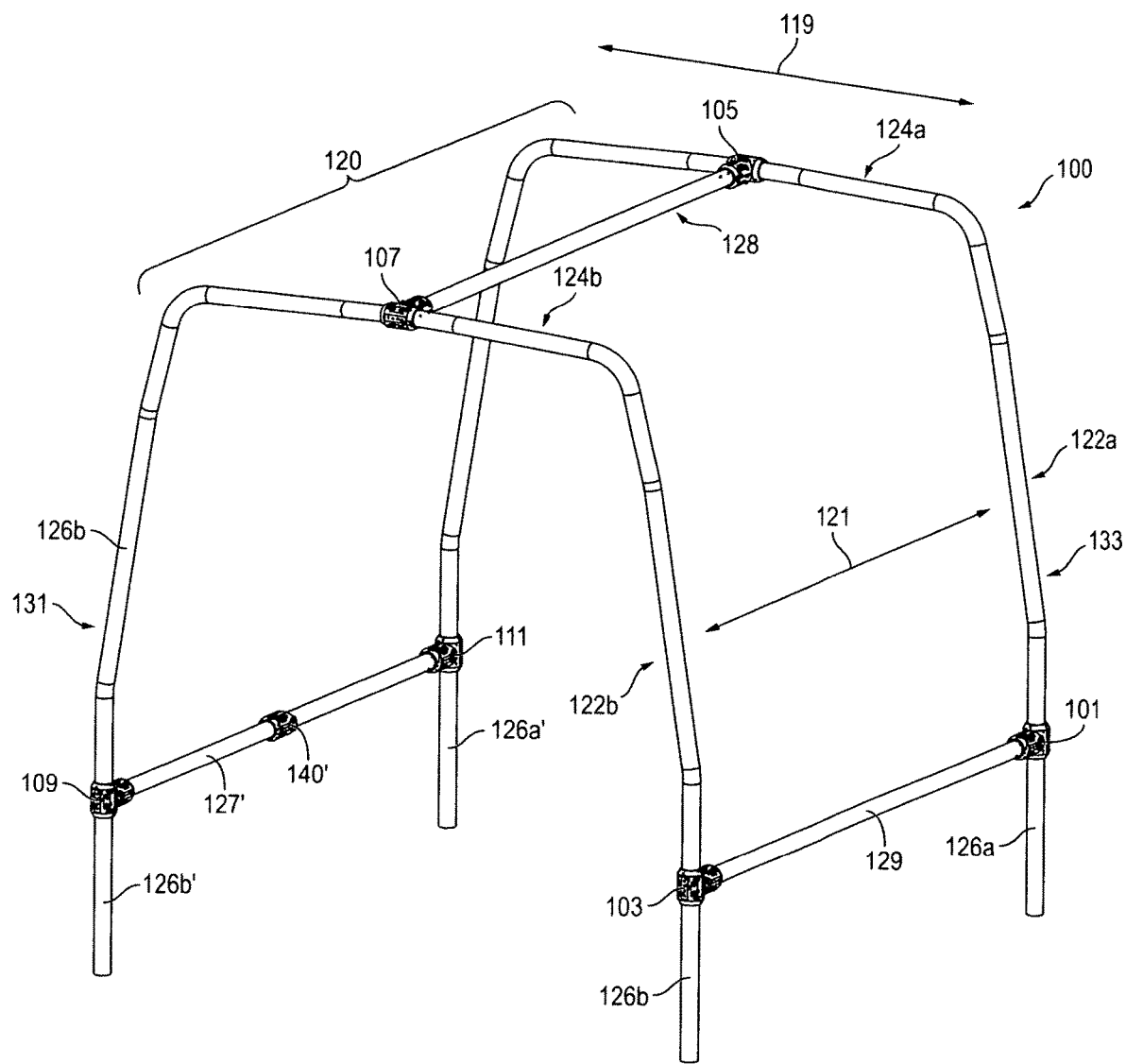
FIG. 2 is a perspective view of one embodiment of the detachable, modular vehicle conversion system of the present invention.

Referring now to FIG. 6, the universal tee adapter unit 152 is preferably secured to the universal adapter coupler 140 through clamping screws 149'' to from a T-bar connector 91, such as the T-bar connectors 93, 95, 97 101, 103, 105, 107, 109 and 111 shown in FIGS. 1 and 2. The T-bar connector 91 is used to secure tubular segments 28 and 26 of canopy support structure or canopy support frame 120 anywhere that tubular segments 28 and 26 intersect, most notably where spanner elements or spanner tubes 125 and 127 and/or 127' 128 and 129 are used. Note that the tubular segment 26 can either have terminus ends (not shown) that are secured within the universal adapter coupler 140 or can be continuous through the universal adapter coupler 140, while the tubular segment 28 has a terminus end that is secured within the universal tee adapter unit 152. While the use of T-bar connectors, such as the T-bar connector 91, is preferred, it will be clear to one skilled that art that intersecting tubular portions of the canopy support structure or canopy support frame 120 can be secured using other techniques, such as welding, bonding, clamps and the like. However, the use of the T-bar connectors provides the ability incorporate or attach a wide variety of auxiliary units or features to the conversion system via attachment apertures 151, 153 and 154.

FIG. 7 shows an embodiment of a floor coupler 164. In a preferred embodiment, as shown, one terminus end 169 of the floor coupler 164 is flat to allow it to be positioned flush against the top surface of a base plate, such as the base plate 162 shown in FIGS. 8A-B. As shown, the flat surface 169 includes receiving apertures 161 into which securing devices are inserted through base plate-coupler apertures 168 to secure the floor coupler 164 to the base plate 162. In alternative embodiments, the terminus end 169 may be tapered to fit within the base plate aperture 167 for a more rigid connection. In a preferred embodiment, the floor coupler 164 includes two clamp segments 166a and 166b with concave inner surfaces 167 that are clamped around tubular straight leg portions of a canopy support structure or canopy support frame 120, such the tubular straight leg portions or leg segments 126a, 126a', 126b and 126b' shown in FIG. 2. The two clamp segments 166a and 166b are secured together and around the tubular straight leg portions of a canopy support structure or canopy support frame 120 through one or more clamp screws 168. The floor coupler 164 can include any number of attachment apertures 160 and 160' to attach auxiliary units or features, such as described previously.

The base plate 162 is threaded, bolted, or otherwise secured to the terminus end 169 of the floor coupler 164 using any suitable attachment mechanism including, but not limited to, screws, bolds and clamps. In an alternative embodiment, the base plate 162 is pressure molded or welded to the terminus end 169 of the floor coupler 164. In the embodiment shown in FIGS. 9A-9B, the floor coupler 164 is secured to the base plates 162 and 162' using several screws that pass through base plate-coupler apertures 168 and into the receiving apertures 161 on the floor coupler 164.

FIGS. 8A-B, show views of the base plate 162. In a preferred embodiment shown in FIG. 8A, the bottom side of the base plate 162 includes a recessed apertures 168 around that allow the base plate 162 to remain flush with the vehicle floor after the floor coupler is attached through screws or bolts. The recessed region 167 allows screw and bolt head to be flush with a top surface of the base plate 162. The placement, number, and shape of the various apertures 163 and 168 can vary according to intended use.

Figure 9A:
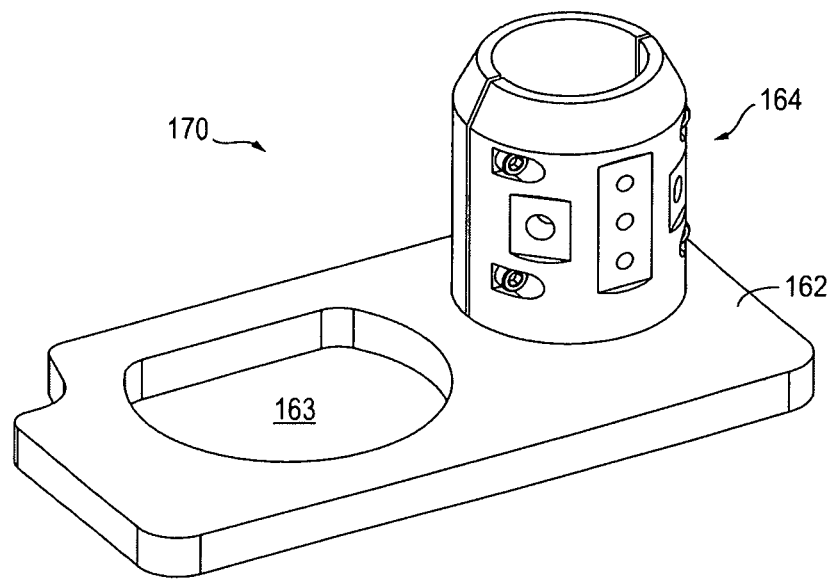
FIG. 9A is a top perspective view of a base-plate stabilizer unit or feature used in embodiments of the detachable, modular vehicle conversion system of the present invention.
Figure 9B:
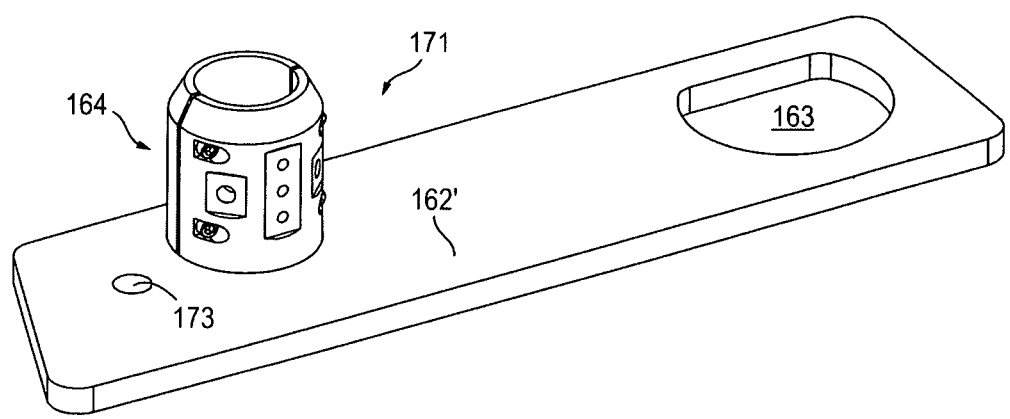
FIG. 9B is a top perspective view of an alternative base-plate stabilizer unit or feature used in embodiments of the detachable, modular vehicle conversion system of the present invention.

FIG. 9A shows a view of the floor coupler 164 attached to the baseplate 162. FIG. 9B shows a view of the floor coupler 164 attached to an alternative baseplate 162'. The combination of a floor coupler and base plate, such as shown in FIGS. 9A-B, are referred to herein as base stabilizer units 170 and 171. In operation the base stabilizer units 170 and 171 are placed on a floor of a vehicle and attached thereto. The base stabilizer units 170 and 171, for example, include a base plate apertures 163 and 163' adapted to receive a factory D-ring cup to secure the base stabilizer units 170 and 171 to the vehicle floor. The shape and size of the base plate aperture 163 depends on the type of vehicle that is being converted. FIG. 9B shows an alternative embodiment of the invention wherein base plate 162' of the base stabilizer unit 171 has additional base plate apertures 173 that can be used to further secure the base stabilizer unit 171 to the vehicle floor.

In constructing a conversion system of the present invention, it is often necessary to have interjecting tubular sections that are not perpendicular with respect to each other, but rather are angled at their points of intersection by more or less than 90 degree. To accomplish this goal, the present invention utilizes both fixed angle couplers 800 and adjustable angle couplers 850, such as described below with reference to FIGS. 10 and 11, respectively.

Figure 10:
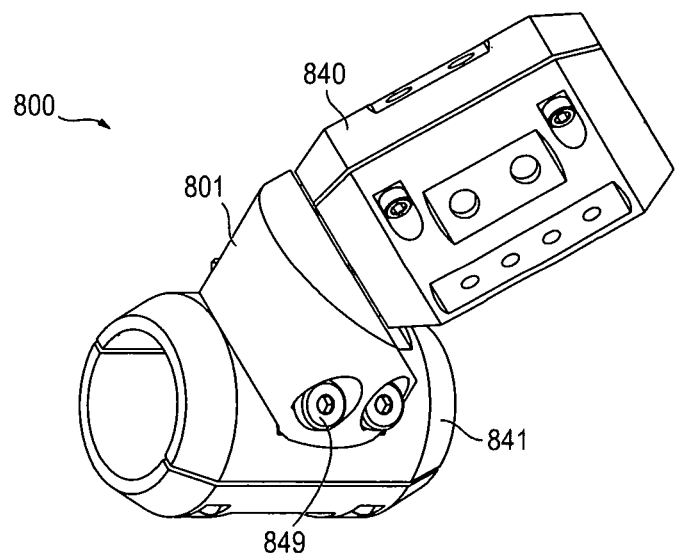
FIG. 10 is a side perspective view of two universal adapter couplers attached together through a fixed-angle adapter unit to form a fixed angle coupler, in accordance with the embodiments of the invention.

The fixed angle coupler 800 shown in FIG. 10 is formed by jointing two universal couplers 840 and 841, such as the universal coupler 140 shown in FIG. 3, together with a fixed-angle adapter unit 801. The fixed angled adapter unit 801 is attached to a side surface of the universal coupler 841 and an end surface of the universal coupler 840. Each universal coupler 840 and 841 is rigidly attached to the fixed-angle adapter unit 801 using clamp screws 849 threaded into available attachment apertures. In an alternative embodiment of the invention, the fixed-angle coupler 800 is formed as a monolithic unit. Preferable, the fixed-angle adapter unit 801 is manufactured from a rigid material similar to the universal adapter couplers 840 and 841.

Figure 11:
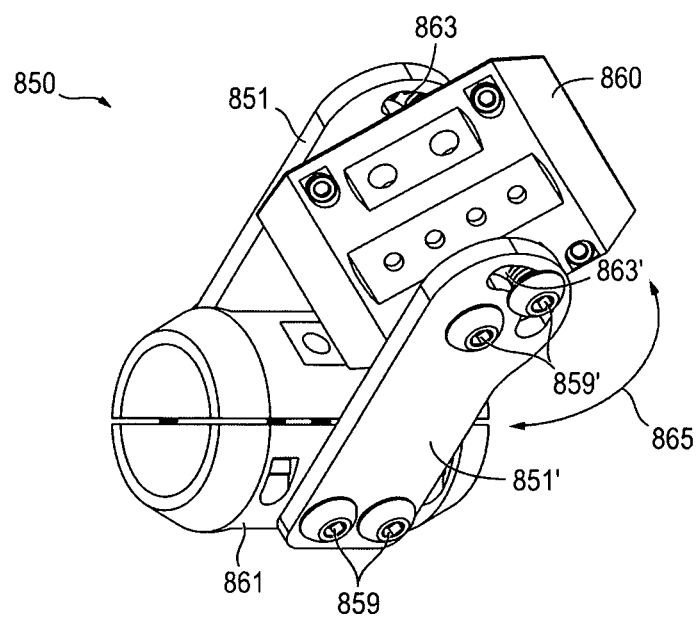
FIG. 11 is a side perspective view of two universal adapter couplers attached together through a variable angle adapter unit to from a variable angle coupler, in accordance with the embodiments of the invention.

In further embodiments of the invention, an adjustable-angle coupler 850 show in FIG. 11 is formed by jointing two universal couplers 860 and 861, such as the universal coupler 140 shown in FIG. 3, together through two adjustable plate structures 851 and 851' with slotted slide features 863 and 863'. The adjustable plate structures 851 and 851' are attached to a side surfaces of each of the universal couplers 860 and 861 using clamp screws 859 and 859' threaded into available attachment apertures. In operation, the clamp screws 859' are loosened and the relative angle of the two universal couplers 860 and 861 is adjusted, as indicated by the arrow 865. The clamp screws 859' are then tighten and the adjustable-angle coupler 850 is installed into the conversion system. Alternatively, the adjustable angle coupler 850 is installed onto tubular sections of the conversion system and then the relative angle of the adjustable-angle coupler 850 is adjusted, as described above. Preferable, the plate structures 851 and 851' are preferably formed for a rigid material similar to the universal adapter couplers 860 and 861.

Figure 13A:
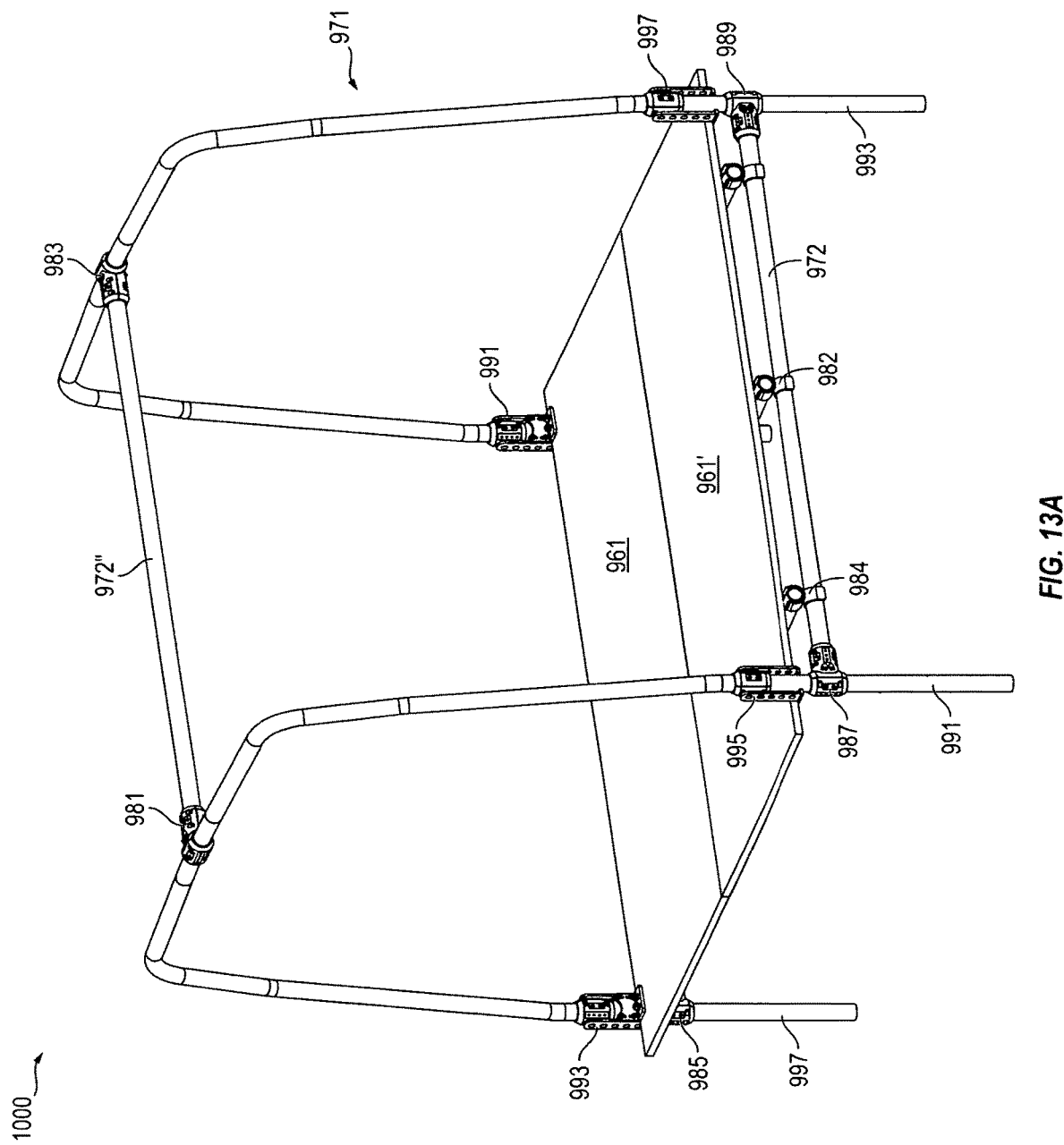
FIG. 13A is a perspective view of a detachable, modular vehicle conversion system of the present invention, showing an auxiliary unit platform in the downward, engaged position.
Figure 13B:
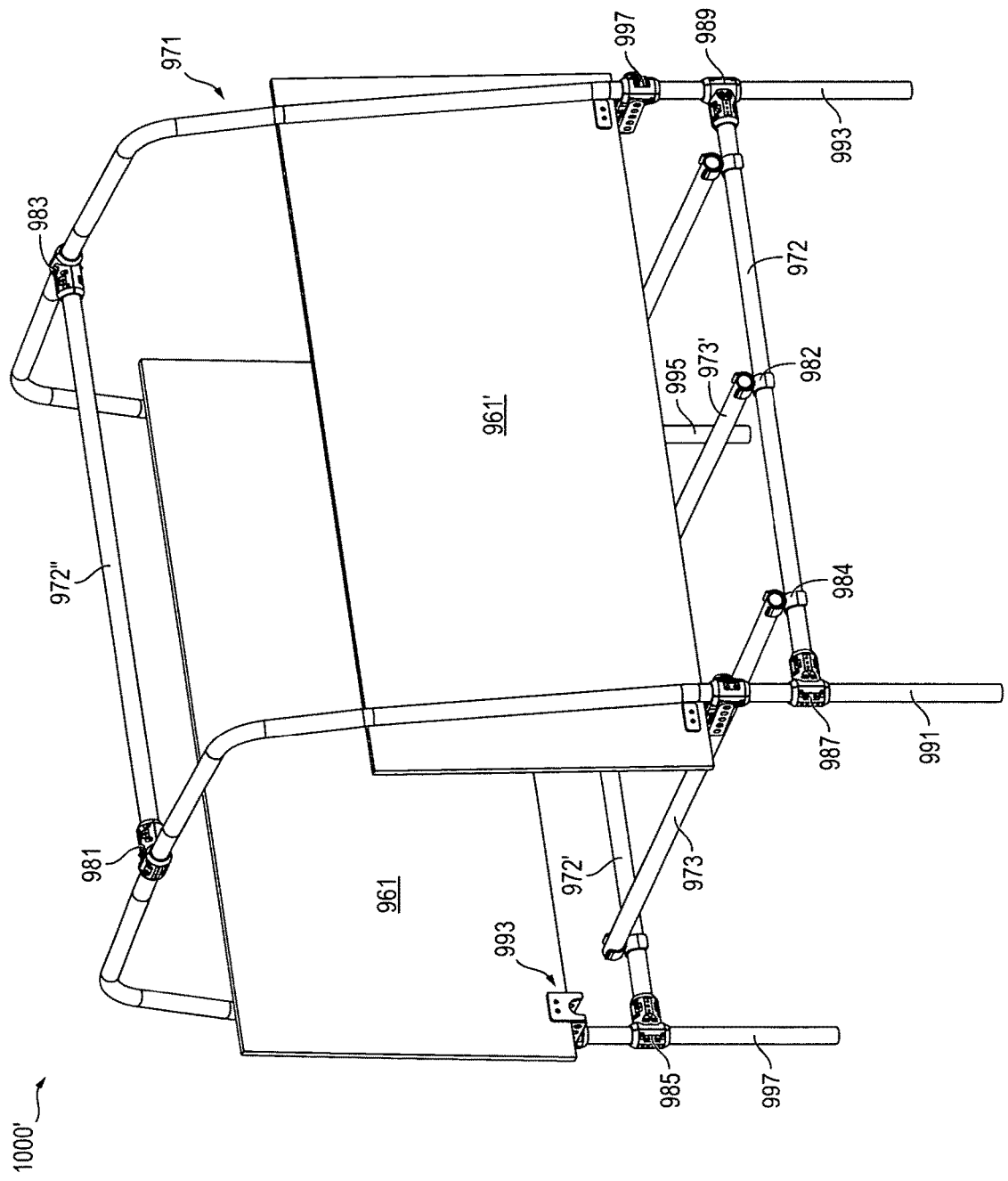
FIG. 13B is a perspective view of the detachable, modular vehicle conversion system in FIG. 13A with the platform sections in the upward, storage position.

Referring now to FIGS. 12A-B, a support hinge assembly 900 is used to hingeably attach shelves, floors or bed supports or other auxiliary features to the canopy support structure or canopy support frame 120 (FIG. 1) or the canopy support structure or canopy support frame 1000 (FIGS. 13A-B). The support hinge assembly 900 includes two swing arm structures 921 and 921'. The two swing arm structures 921 and 921' are coupled to a lower platform structure 925 and an L-shaped upper platform structure 926. The L-shaped upper platform structure 926 is attached to the two swing arm structures through screw features 931 that pass through the back portion 924 of the L-shaped upper platform structure 926. The screw features can be loosened to adjust the spacing between the inner surface of the low platform structure 925 and the inner surface of the L-shaped upper platform structure 926. The support hinge assembly 900 is coupled to a universal coupler 940, such as the universal couplers 140 and 141 shown in FIGS. 3 and 4, through clamping hinge screws 919 and 919'. The clamping hinge screws 919 and 919' include bushing features that allow the clamping hinge screws 919 and 919' to be threaded and tightened in appropriate attachment apertures on the universal coupler 940, while allowing the support hinge assembly 900 to swing freely. The two swing arm structures 921 and 921' include sets of swing arm apertures 920 and 920'. Such that the support hinge assembly 900 swinging span 951 can be adjusted by placing the clamping hinge screws 919 and 919' in the appropriate swing arm apertures 920 and 920'.

In operation the support hinge assembly 900 is either attached to the universal coupler 940 either prior to or after the universal coupler 940 attached to a tubular section or tubular portion 901 of canopy support structure or canopy support frame 120 (FIG. 1) or the canopy support structure or canopy support frame 1000 (FIGS. 13A-B). Once installed, or before being installed, a shelve, a floor or bed support or other auxiliary feature, such as the auxiliary features 961 and 961' (FIGS. 12A-B) are positioned such that a portion of the auxiliary feature is secured to the bolt features 933 and/or sandwiched in the space 948 between the L-shaped upper platform structure 926 and the lower platform structure 925. The combination of a hinge support assembly 900 and a universal coupler is referred to here as a hinge coupler 950.

All of the features that are secured to and/or attached to the universal adapter couplers 140 and 141' (FIGS. 3 and 4), including but not limited to, and universal tee adapters 152 (FIG. 5), fixed-angle adapter unit 801 (FIG. 10), adjustable-angle adjustable plate structures 851 and 851' (FIG. 11) and support hinge assemblies 900 (FIG. 12A), are referred to herein as attachments that are generally secured to and/or attached to the universal adapter couplers 140 and 141' through attachment apertures on outer surfaces of the universal adapter couplers 140 and 141'.

FIGS. 13A-B show views 1000 and 1000' of an exemplary conversion system, in accordance with the embodiments of the invention. The conversion system includes a canopy support structure or canopy support frame 971 formed from tubular segments. The tubular segments include a number arching support tubes, straight tubes as well as spanner elements or spanner tubes 972, 972' and 972" and other support tubes or bars. The tubular segments and spanner elements or tubes are attached or joined together through T-bar connectors 981, 983, 985, 987 and 989, such as the T-bar connector 91 shown in FIG. 6. The T-bar connectors 981, 983, 985, 987 and 989 are formed from universal couplers, such as the universal couplers 140 or 141 shown in FIGS. 3 and 4, universal tee adapter units, such as the universal tee adapter unit 152 shown in FIG. 5.

In accordance with the embodiments of the invention the conversion system also includes a number of hinge couplers 991, 993, 995 and 997, such as the hinge coupler 950 shown in FIG. 12B. As described above the hinge couplers 991, 993, 995 and 997 are formed from support hinge assemblies, such as the support hinge assembly 900 shown in FIG. 12A, hingeably attached to universal couplers, such as the universal couplers 140 or 141 shown in FIGS. 3 and 4. The hinge couplers 991, 993, 995 and 997 are attached to auxiliary units 961 and 961' and they allow the auxiliary units to place in an upward positions, such as shown in FIG. 13B and in a downward position, such as shown in FIG. 13A. In this example auxiliary units 961 and 961' provide a support for a floor, storage shelving or a bed platform.

The conversion system also preferably includes a number of support bar structures 973 and 973' that help support the auxiliary units when in the lowered downward positions. The support bar structures 973 and 973' can be coupled to the spanner bars or tubes 972 and 972', or another portions of the canopy support structure or canopy support frame 971 through snap couplers 984, or T-bar connectors, such as the T-bar connector 91 shown in FIG. 6.

It will be clear to one skilled in the art that the conversation system of the present invention can also include any number of fixed-angle couplers, such as the fixed-angle coupler 800 shown in FIG. 10, as well as any number of variable-angle couplers, such as the variable-angle coupler 85 shown in FIG. 11. Also, as described above the conversion system is preferably secured to a cargo bed of a vehicle through base stabilizer units, such as the base stabilizer units 170 and 171 shown in FIGS. 9A-B that couple to tubular leg portions 991, 993, 995 and 997 of the canopy support structure or canopy support frame 971. In order to further secure the conversion system of the present invention within a cargo area of a vehicle, portions of the canopy support structure or canopy support frame 971 can be secures to walls and/or the ceiling of the cargo area.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiments chosen for illustration without departing from the spirit and scope of the invention.

What is claimed is:

1. A system comprising:
   a) arching support structures;
   b) spanner bar structures; and
   c) universal adapter couplers for attaching the spanner bar structures to the arching support structures to form a canopy support frame that fits within a vehicle cargo area the universal adapter couplers comprising two elongated segments that attach together, the two elongated segments including inner surfaces that fit around the canopy support frame and having attachment apertures on outer surfaces for linking attachments to the universal adapter couplers with the universal adapter couplers attached to the canopy support frame, wherein the attachments include T-bar adapter units, hinge support assemblies, fixed angle adapter units and variable angle adapter units that, along with the universal adapter couplers, form T-bar connectors, hinge support connectors, fixed angle connectors and variable angle connectors.

2. The system of claim 1, wherein the elongated segments of the universal adapter couplers are attached together through clamping screws.

3. The system of claim 1, further comprising base stabilizer units for attaching the canopy support frame to a floor of the vehicle cargo area through legs on the arching support structures.

4. The system of claim 3, wherein the base stabilizer units each include a floor coupler attached to a floor base plate, wherein the floor coupler is formed from two elongated segments that attach together and fit around the legs and have receiving apertures on terminus ends to secure the floor coupler to the floor base plate through attachment screws.

5. A system comprising:
   a) a canopy support frame that fits within a vehicle cargo area, the canopy support frame formed from segments that include arching support structures, spanner bar structures and support legs; and
   b) universal adapter couplers comprising two elongated segments that attach together, the two elongated segments including inner surfaces that fit around the segments of the canopy support frame and having attachment apertures on outer surfaces for linking attachments to the universal adapter couplers with the universal adapter couplers attached to the canopy support frame, wherein the attachments include T-bar adapter units, hinge support assemblies, fixed angle adapter units and variable angle adapter units that, along with the universal adapter couplers, form T-bar connectors, hinge support connectors, fixed angle connectors and variable angle connectors.

6. The system of claim 5, wherein the elongated segments of the universal adapter couplers are attached together through clamping screws.

7. The system of claim 5, wherein the T-bar adapter units that along with the universal adapter couplers form T-bar connectors that connect the spanner bar structures to the arching support structures.

8. The system of claim 5, wherein the hinge support connectors are hingeably attaching auxiliary units to the canopy support frame.

9. The system of claim 5, wherein each fixed angle connector is formed by a fixed angle adapter unit linked to two of the universal adapter couplers through the attachment apertures.

10. The system of claim 5, wherein each variable angle connector is formed by adjustable plate structures linked to two of the universal adapter couplers through the attachment apertures.

11. The system of claim 5, further comprising base stabilizer units for attaching the canopy support frame to a floor of the vehicle cargo area through the support legs.

12. The system of claim 11, wherein the base stabilizer units each include a floor coupler attached to a floor base plate, wherein the floor coupler is formed from two elongated segments that attach together and fit around the legs and have receiving apertures on terminus ends to secure the floor coupler to the floor base plate through attachment screws.

13. A system comprising:
   a) a canopy support frame that fits within a vehicle cargo area, the canopy support frame formed from segments that include tubular arching support structures and tubular spanner bar structures; and
   b) universal adapter couplers comprising two elongated segments that attach together, the two elongated segments including inner surfaces that fit around the tubular segments of the canopy support frame and having attachment apertures on outer surfaces for linking attachments to the universal adapter couplers with the universal adapter couplers attached to the canopy support frame, wherein the attachments include T-bar adapter units, hinge support assemblies, fixed angle adapter units and variable angle adapter units that, along with the universal adapter couplers, form T-bar connectors, hinge support connectors, fixed angle connectors and variable angle connectors; and c) platform structures that attach to the hinge support connectors, wherein the platform structures fold up and down through the hinge support connectors.

* * * * *